United States Patent
Park

(10) Patent No.: US 11,323,331 B2
(45) Date of Patent: May 3, 2022

(54) CLOUD SERVER AND OPERATING METHOD OF THE SAME

(71) Applicant: Samsung Electronics Co., Ltd., Suwon-si (KR)

(72) Inventor: Eunsoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/105,837

(22) Filed: Nov. 27, 2020

(65) Prior Publication Data

US 2021/0176134 A1 Jun. 10, 2021

(30) Foreign Application Priority Data

Dec. 10, 2019 (KR) .......................... 10-2019-0163975

(51) Int. Cl.
*G06F 15/16* (2006.01)
*H04L 41/12* (2022.01)
*H04L 67/10* (2022.01)

(52) U.S. Cl.
CPC .............. *H04L 41/12* (2013.01); *H04L 67/10* (2013.01)

(58) Field of Classification Search
CPC ................................. H04L 41/12; H04L 67/10
See application file for complete search history.

(56) References Cited

U.S. PATENT DOCUMENTS

| | | | |
|---|---|---|---|
| 8,392,838 | B2 | 3/2013 | Chawla et al. |
| 9,274,821 | B2 | 3/2016 | Chawla et al. |
| 2017/0344292 | A1* | 11/2017 | Sterin ................... G06F 3/0608 |
| 2018/0018116 | A1 | 1/2018 | Hallisey |
| 2018/0246745 | A1 | 8/2018 | Aronovich et al. |
| 2019/0102214 | A1 | 4/2019 | Kondo et al. |
| 2019/0394219 | A1* | 12/2019 | Huang .................... H04L 41/22 |
| 2020/0125533 | A1* | 4/2020 | Gladkikh ............ G06F 9/45558 |
| 2020/0133789 | A1* | 4/2020 | Natanzon ............ G06F 16/2365 |
| 2020/0210071 | A1* | 7/2020 | Gunjal .................. G06F 3/0655 |
| 2021/0176065 | A1* | 6/2021 | Osaki ................... H04L 9/0863 |

FOREIGN PATENT DOCUMENTS

| | | |
|---|---|---|
| KR | 10-1532263 B1 | 6/2015 |
| KR | 10-1586720 B1 | 1/2016 |

OTHER PUBLICATIONS

Microsoft Docs, Sidecar pattern—Cloud Design Patterns, https://docs.microsoft.com/en-us/azure/architecture/patterns/sidecar, Jun. 23, 2017.

(Continued)

*Primary Examiner* — Padma Mundur

(74) *Attorney, Agent, or Firm* — Jefferson IP Law, LLP

(57) ABSTRACT

A cloud server for providing a container-based cloud service, and a method thereof are provided. The cloud server includes a communicator configured to receive a volume mount request, a memory storing one or more instructions, and a processor configured to execute the one or more instructions stored in the memory to, when the processor receives a volume mount request from a first user of a first container among a plurality of containers, identify the first container, check a volume mount right of the first container, and mount a volume that is mountable on the first container.

19 Claims, 8 Drawing Sheets

(56) References Cited

OTHER PUBLICATIONS

Bilgin Lbryam et al., 'Kubernetes Patterns: Reusable Elements for Designing Cloud-Native Applications', First Edition, pp. 1-244, Apr. 4, 2019 [retrieved on Feb. 15, 2021] Retrieved from: <URL: https://www.redhat.com/cms/managed-files/cm-oreilly-kubernetes-patterns-ebook-f19824-201910-en.pdf> pp. 131-171.
International Search Report dated Feb. 26, 2021, issued in International Application No. PCT/KR2020/016896.

* cited by examiner

CLOUD SERVER AND OPERATING METHOD OF THE SAME

CROSS-REFERENCE TO RELATED APPLICATION(S)

This application is based on and claims priority under 35 U.S.C. § 119(a) of a Korean patent application number 10-2019-0163975, filed on Dec. 10, 2019, in the Korean Intellectual Property Office, the disclosure of which is incorporated by reference herein in its entirety.

BACKGROUND

1. Field

The disclosure relates to a cloud server and a method of operating the same. More particularly, the disclosure relates to a cloud server for providing a container-based cloud service and a method of operating the cloud server.

2. Description of the Related Art

Virtualization technology is base technology for enabling cloud computing. Virtualization technology, which has emerged for the purpose of efficient use of server resources, has largely been developed as hardware-based virtualization technology and software technology, and is being used in cloud computing. Recently, as virtualization technology for cloud computing, container-based open source platforms are becoming a general trend.

A container uses a less complicated method than virtualization or para-virtualization. The container isolates and installs programs and libraries for operating a server without installing a guest operating system (OS), and shares OS resources such as system calls with a host machine to thereby greatly reduce image capacity.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cloud server enabling a user to easily perform a task of dynamically adding or deleting a new volume in a container-based cloud system, and a method of operating the cloud server.

Additional aspects will be set forth in part in the description which follows and, in part, will be apparent from the description, or may be learned by practice of the presented embodiments.

In accordance with an aspect of the disclosure, a cloud server for providing a container-based cloud service is provided. The cloud server includes a communicator configured to receive a volume mount request, a memory storing one or more instructions, and a processor configured to execute the one or more instructions stored in the memory to generate a first sub container corresponding to a first container in the same host where the first container is located, control, when a volume mount request is received from a first user of the first container, the volume mount request to be transferred to the first sub container, control the first sub container to check a volume mount authority of the first container and request a host operating system (OS) to mount a first volume that is mountable on the first container, and control the first volume to be mounted on the first sub container.

The processor according to an embodiment of the disclosure may be further configured to execute the one or more instructions to control the volume mount request to be transferred from the first container to the first sub container through an application programming interface (API).

The first container and the first sub container according to an embodiment of the disclosure may share a host volume, and the host volume may be correctable by only the first sub container.

The processor according to an embodiment of the disclosure may be further configured to execute the one or more instructions to control the first volume to be mounted to the first container by allowing the first container and the first sub container to share the host volume.

The communicator according to an embodiment of the disclosure may be further configured to receive a first application generation request from the first user, and the processor may be further configured to execute the one or more instructions to generate the first container and the first sub container corresponding to the first application, in response to the first application generation request.

The first container according to an embodiment of the disclosure may include the first application, and the first sub container may include a sidecar of the first application.

The processor according to an embodiment of the disclosure may be further configured to execute the one or more instructions to generate the first container and the first sub container in a first name space, and generate a second container and a second sub container corresponding to the second application in a second name space, in response to a request for generating the second application.

The first container according to an embodiment of the disclosure may be assigned a user authority level, and the first sub container may be assigned an administrator authority level.

In accordance with another aspect of the disclosure, a method of operating a cloud server for providing a container-based cloud service is provided. The method includes generating a first sub container corresponding to the first container in the same host where the first container is located, receiving a volume mount request from a first user of the first container, transferring the volume mount request to the first sub container, checking a volume mount authority of the first container by the first sub container, and requesting a host operating system (OS) to mount a first volume that is mountable on the first container, and mounting the first volume on the first sub container.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
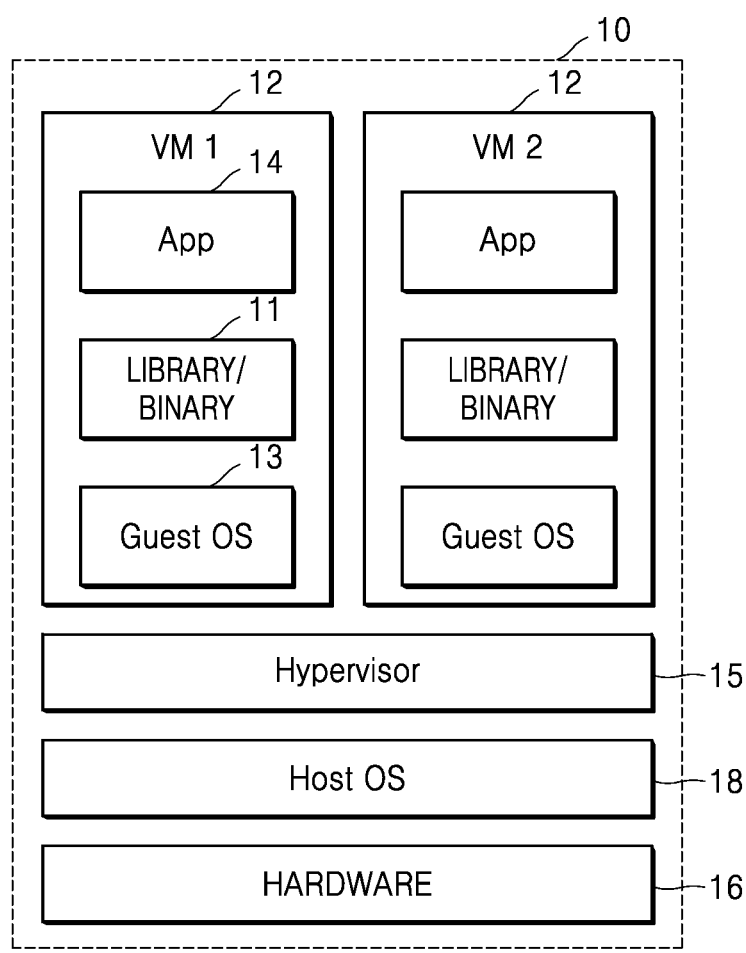
FIG. 1A shows a virtual machine-based cloud system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the entire contents of the disclosure, not by simply stating the terms themselves.

It will be understood that when a certain part "includes" a certain component, the part does not exclude another component but can further include another component, unless the context clearly dictates otherwise. As used herein, the terms "portion", "module", or "unit" refer to a unit that can perform at least one function or operation, and may be implemented as software or hardware or as a combination of software and hardware.

Throughout the disclosure, the expression "at least one of a, b or c" indicates only a, only b, only c, both a and b, both a and c, both b and c, all of a, b, and c, or variations thereof.

In the embodiments of the specification, the term "user" means a viewer who watches images displayed on an electronic device or a person who controls the functions or operations of an electronic device, and may include an administrator or an installation engineer.

In the embodiments of the disclosure, "volume" may mean a local storage in a cloud server or a remote data storage, and the "volume" may mean a logical volume including a single or plurality of physical storages.

Hereinafter, the embodiments of the disclosure will be described in detail with reference to the appended drawings in order for one of ordinary skill in the art to easily embody the disclosure. However, the disclosure can be implemented in various different forms, and is not limited to the embodiments described herein. Also, in the drawings, parts irrelevant to the description are not shown in order to definitely describe the disclosure, and throughout the entire specification, similar components are assigned like reference numerals.

FIG. 1A shows a virtual machine-based cloud system according to an embodiment of the disclosure.

Figure 1B:
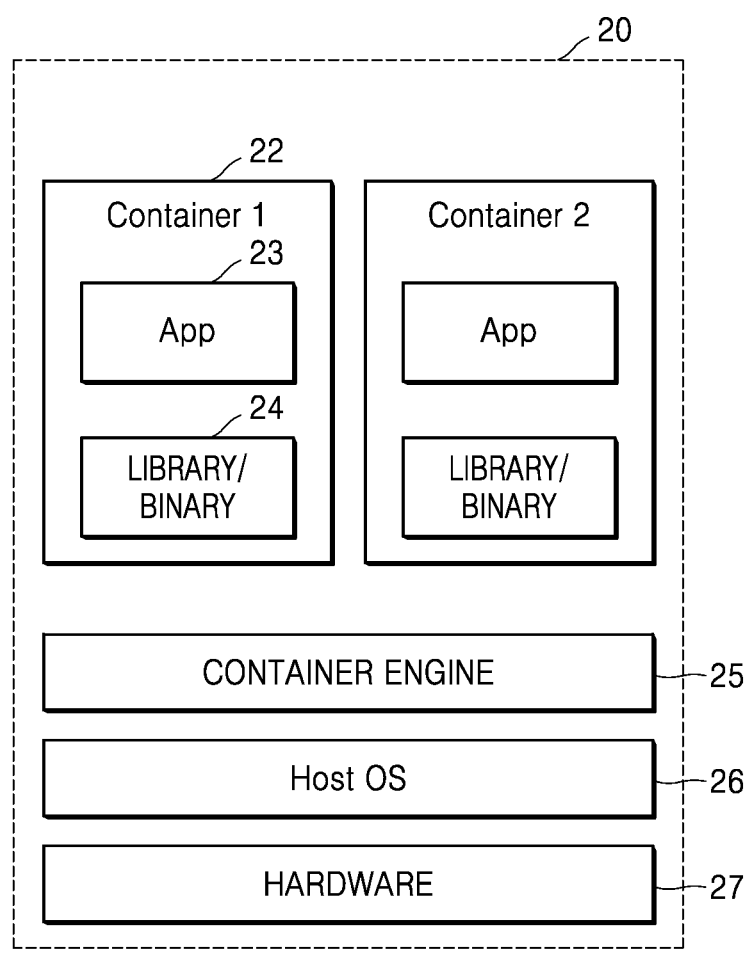
FIG. 1B shows a container-based cloud system, according to an embodiment of the disclosure.

FIG. 1B shows a container-based cloud system according to an embodiment of the disclosure.

A virtual machine (VM) 12 is for software implementation of a computing environment.

Referring to FIG. 1A, when hardware is virtualized in a virtual machine-based cloud system 10, a plurality of virtual machines 12 may be generated on the hardware, and each virtual machine 12 may drive an independent guest operating system (OS) environment 13. An internal structure of each virtual machine 12 may be similar to a computing environment of a physical server, and each virtual machine 12 may use hardware resources, such as a central processing unit (CPU), a memory, and a storage, like an actual server, drive OS therein, and drive application programs (not shown). Differences between a virtual machine 12 and a physical server may be that several virtual machines 12 may exist at the same time and each of the individual virtual machines 12 may have different driving environments so as to perform various applications. Each virtual machine 12 may include a library, a binary, other configuration files, etc. (11), required to execute an application App 14. Herein, the library means a sub program having a predefined function or a group of source codes, which is required to or usable in common to drive a program. The library may include a pre-written code, such as a function (a sub routine), a definition about a class, configuration data, etc. Also, the binary means a data file encoded in a binary format for purposes of computer storage and processing, and may be a compiled or compressed result of a code The virtual machine-based cloud system 10 may include a hypervisor 15 to enable the virtual machines 12 to perform a plurality of OS at the same time. The hypervisor 15 may virtualize a resource (a physical resource of hardware 16) of a host system and provide the virtualized resource to the virtual machines 12 such that the virtual machines 12 operate independently. The virtual machine-based cloud system 10 further includes a host OS 18.

Because a virtual machine includes OS (for example, guest OS 13), the virtual machine may have a large size, and consume a major portion of virtual system resources of hardware required for the OS that the virtual machine drives.

Referring to FIG. 1B, a container-based cloud system 20 may include a container 22, and the container 22 means a space where an application App 23 is isolated from an environment in which the application App 23 is driven. The container-based cloud system 20 may isolate, without using any hypervisor, a required amount of hardware resources of hardware module 27 and assign the required amount of the hardware resources to the container 22. Because the container 22 shares hardware resources with other containers, the container 22 may be assigned an amount of the hardware resources, required to execute an application. Accordingly, the entire resources of the container-based cloud system 20 may be efficiently used. The container-based cloud system 20 further includes a host OS 26.

A container engine 25 may manage and tune execution of a plurality of containers. For example, the container engine 25 may manage generation, deletion, control of start and stop points, scheduling, load balancing, clustering, etc. of the container 22.

Also, the container 22 may package all files required to execute the application App 23, except for OS, unlike the virtual machine. The container 22 may package and distribute a library, a binary, other configuration files, etc. (24), required to execute the application App 23. Herein, the library means a sub program having a predefined function or a group of source codes, which is required to or usable in common to drive a program. The library may include a pre-written code, such as a function (a sub routine), a definition about a class, configuration data, etc. Also, the binary means a data file encoded in a binary format for purposes of computer storage and processing, and may be a compiled or compressed result of a code.

Because the container 22 includes no OS, unlike the virtual machine, the container 22 may have a small size, and do not require boot-up of OS. Therefore, the container 22 may take a short time to start a service. Also, the container 22 may be more easily copied and distributed than the virtual machine, due to its small size.

Meanwhile, in a virtual machine environment, an application may request guest OS in the virtual machine to perform a volume mount/unmount task and perform the volume mount/unmount task (a volume hot-plugging function). However, due to characteristics of the container 22, the volume mount/unmount task may require a high-level authority (for example, an administrator authority), and therefore, there may be difficulties in applying the volume hot-plugging function to a user container having a user authority.

Accordingly, to dynamically add/delete a new volume to/from a container, the user may need to restart the container for changing (for example, an internal change for using an application programming interface (API) provided whenever an access to a volume occurs) an application. Also, when a high-level authority (for example, an administrator authority) is assigned to a user application, a malicious user may influence other applications.

Figure 2:
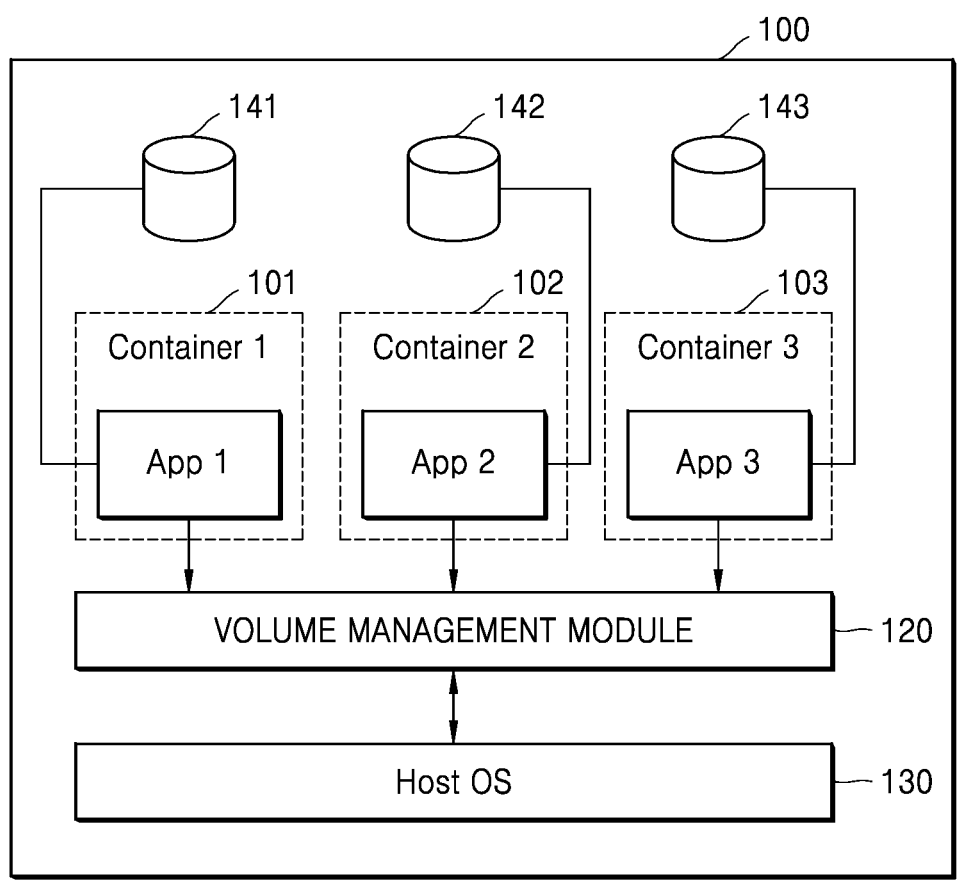
FIG. 2 is a reference view for describing a method of operating a container-based cloud server according to an embodiment of the disclosure.

FIG. 2 is a reference view for describing a method of operating a container-based cloud server according to an embodiment of the disclosure.

Referring to FIG. 2, a container-based cloud server 100 (hereinafter, simply referred to as a cloud server 100) may provide a container-based cloud service. When the cloud server 100 receives a generation request for an application from a user, the cloud server 100 may generate the application, and a container including a library, a binary, and other configuration files, required to execute the application. For example, when the cloud server 100 receives a generation request for a first application App 1 from a first user, the cloud server 100 may generate the first application App 1, and a first container 101 including a library, a binary, and other configuration files, required to execute the first application App 1. When the cloud server 100 receives a generation request for a second application App 2 from a second user, the cloud server 100 may generate the second application App 2, and a second container 102 including a library, a binary, and other configuration files, required to execute the second application App 2. Also, when the cloud server 100 receives a generation request for a third application App 3 from a third user, the cloud server 100 may generate the third application App 3, and a third container 103 including a library, a binary, and other configuration files, required to execute the third application App 3.

Meanwhile, the cloud server 100 may receive a volume mount request from a first application user (for example, the first user). A volume mount may be a task of mounting a volume (for example, a remote data storage, etc.) on a predefined directory/folder of an application, and, through the volume mount, a direct access to massive data without an additional copy or movement of data may be possible.

When the volume mount request from the first user is received, a volume management module 120 may identify the first application App 1 to check the first user's authority to determine whether there is a volume that is mountable on the first application App 1. When the volume management module 120 determines that a plurality of volumes are mountable on the first application App 1, the volume management module 120 may select an optimal volume from among the plurality of volumes, and request host OS 130 to mount the volume. The host OS 130 may mount the volume requested from the volume management module 120 on a predefined directory/folder of the first application App 1. Accordingly, a first volume 141 may be mounted on the predefined directory/folder of the first application App 1.

When the volume management module 120 receives a volume mount request from a second application user (for example, the second user), the volume management module 120 may perform a control operation of mounting a second volume 142 on a predefined directory/folder of the second application App 2 by the same method. Also, when the volume management module 120 receives a volume mount request from a third application user (for example, the third user), the volume management module 120 may perform a control operation of mounting a third volume 143 on a predefined directory/folder of the third application App 3. In FIG. 2, the first, second and third volumes 141, 142, and 143 are shown to be located inside the cloud server 100. However, the first, second, and third volumes 141, 142, and 143 may be local storages inside the cloud server 100 or remote storages outside the cloud server 100.

Figure 3:
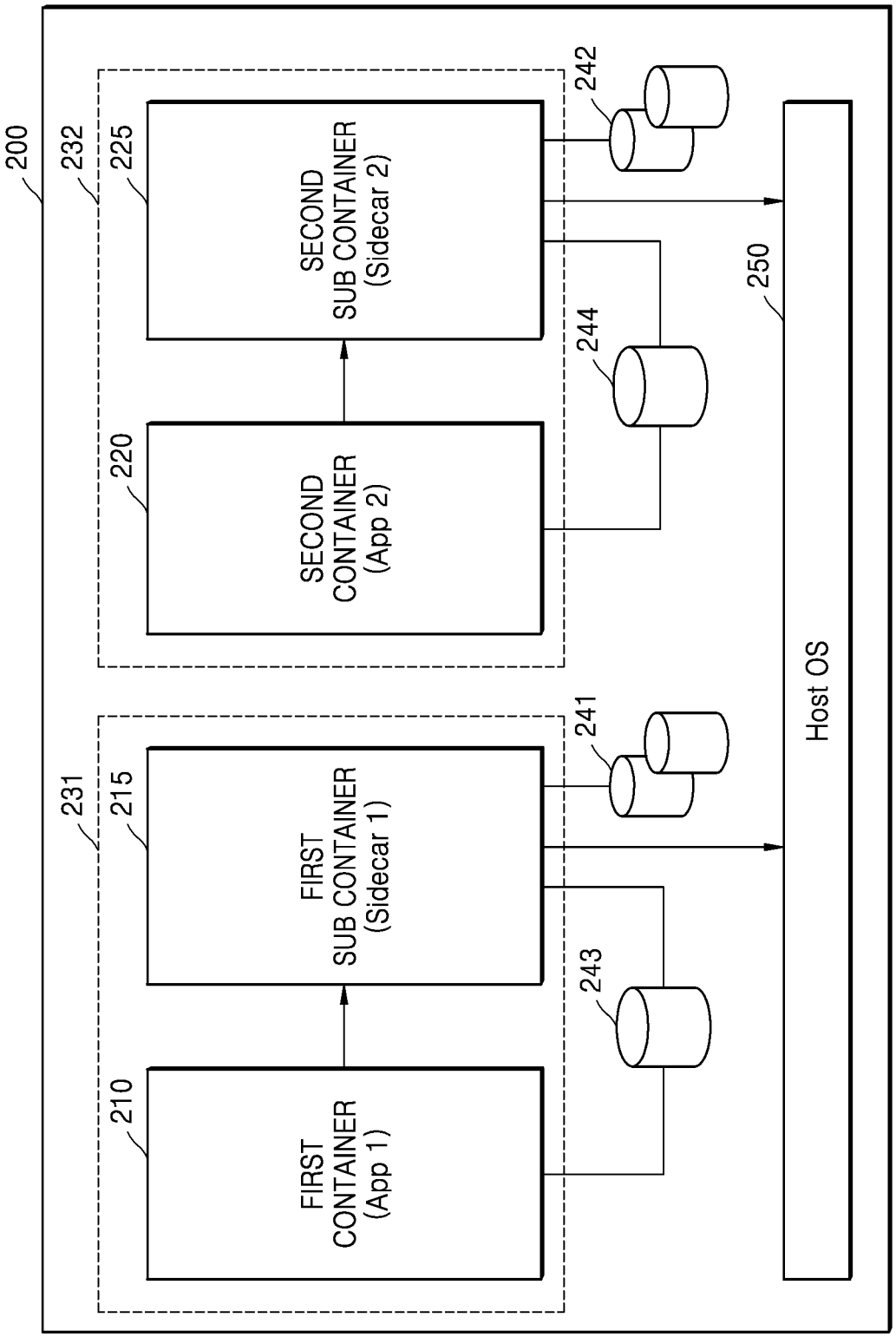
FIG. 3 is a reference view for describing a method of operating a container-based cloud server, according to an embodiment of the disclosure.

FIG. 3 is a reference view for describing a method of operating a container-based cloud server according to an embodiment of the disclosure.

Referring to FIG. 3, when a cloud server 200 receives an application generation request from a user, the cloud server 200 may generate an application container including an application, and a sub container corresponding to the application container.

For example, when the cloud server 200 according to an embodiment of the disclosure receives a generation request for the first application App 1, the cloud server 200 may generate the first application App 1, a first container 210 including a library, a binary, and other configuration files, required to execute the first application App 1, and a first sub container 215 corresponding to the first container 210 in a host 231. The first sub container 215 may be a sidecar container including a sidecar Sidecar 1 of the first application App 1, although not limited thereto. For example, a sidecar may be an assistance application that is distributed to the same host where a main application (for example, the first application App 1) is located to expand and support functions of the main application.

When the first container 210 and the first sub container 215 are generated in the same host 231, a time for communications between the first container 210 and the first sub container 215 may be shortened. Also, because the first sub container 215 is not a function implemented in the first application App 1, the first sub container 215 may have no restrictions on programing languages.

Also, when the cloud server 200 receives a generation request for the second application App 2, the cloud server 200 may generate the second application App 2, a second container 220 including a library, a binary, and other configuration files, required to execute the second application App 2, and a second sub container 225 corresponding to the second container 220 in another host 232. The second sub container 225 may be a sidecar container including a sidecar Sidecar 2 of the second application App 2, although not limited thereto.

According to an embodiment of the disclosure, the first container 210 and the first sub container 215 may share the same name space, and also, the second container 220 and the second sub container 225 may share the same name space. A name space means isolating processes from each other in Linux. Also, the first sub container 215 may be accessible by only the first container 210, and the second sub container 225 may be accessible by only the second container 220.

For example, the first container 210 may transmit a volume mount/unmount request to the first sub container 215 by using REST API, and the second container 220 may transmit a volume mount/unmount request to the second sub container 225 by using REST API (for example, (POST, /mount), (POST, /unmount), (https://localhost/mount), (https://localhost/unmount), etc.). The first container 210 may be disallowed to transmit a volume mount/unmount request to the second sub container 225, and the second container 220 may be disallowed to transmit a volume mount/unmount request to the first sub container 215.

The first container 210 and the first sub container 215 may be included in the same network (host), and the first sub container 215 may block an external network to thus block an access of the second container 220 included in another network.

Also, the first sub container 215 may use an encryption communication (for example, HTTPS) protocol of REST API to block an access of the second container 220 included in the other network.

Accordingly, a user of the first application App 1 may be disallowed to mount or unmount a volume of the second application App 2, and a user of the second application App 2 may be disallowed to mount or unmount a volume of the first application App 1. Therefore, security for volumes mounted on applications may be secured.

When the first sub container 215 receives a volume mount request from the first container 210, the first sub container 215 may check a volume mount authority of the first container 210. The first sub container 215 may determine whether there is a volume that is mountable on the first application App 1. When the first sub container 215 determines that there are a plurality of volumes that are mountable on the first application App 1, the first sub container 215 may select an optimal volume from among the plurality of volumes to request the host OS 250 to mount the volume. The host OS 250 may mount the volume requested from the first sub container 215 on a predefined directory/folder of the first sub container 215. Accordingly, a first volume 241 may be mounted on the predefined directory/folder of the first sub container 215.

Meanwhile, referring to FIG. 3, the predefined directory/folder of the first container 210 and the predefined directory/folder of the first sub container 215 may share a host volume 243, and may be connected to each other through the host volume 243. Accordingly, the first container 210 may access the first volume 241 mounted on the predefined directory/folder of the first sub container 215 through the host volume 243. In this case, the first container 210 may be capable of performing a read operation on the host volume 243, and may be incapable of performing a write (for example, correct or store) operation on the host volume 243. In contrast, the first sub container 215 may be capable of performing both read and write operations on the host volume 243.

The predefined directory/folder of the second container 220 and the predefined directory/folder of the second sub container 225 may share a host volume 244, and may be connected to each other through the host volume 244. Accordingly, the second container 220 may access the second volume 242 mounted on the predefined directory/folder of the second sub container 225 through the host volume 244.

Meanwhile, the first sub container 215 may receive a volume unmount request from the first container 210. The volume unmount request may be requested through REST API (for example, "https://localhost/unmount") When the first sub container 215 receives the volume unmount request, the first sub container 215 may check a volume unmount authority of the first container 210. The first sub container 215 may determine whether there is an additional volume mounted on the first application App 1, and request the host OS 250 to unmount any additional volume. The host OS 250 may unmount the additional volume mounted on the predefined directory/folder of the first sub container 215.

After the first volume 241 is unmounted from the first sub container 215, the first container 210 may be disallowed to access the first volume 241 through the host volume 243.

Meanwhile, in FIG. 3, the first volume 241 and the second volume 242 are shown to be located in the cloud server 200. However, the first volume 241 and the second volume 242 may be local storages inside the cloud server 200 or remote data storages outside the cloud server 200.

Figure 4:
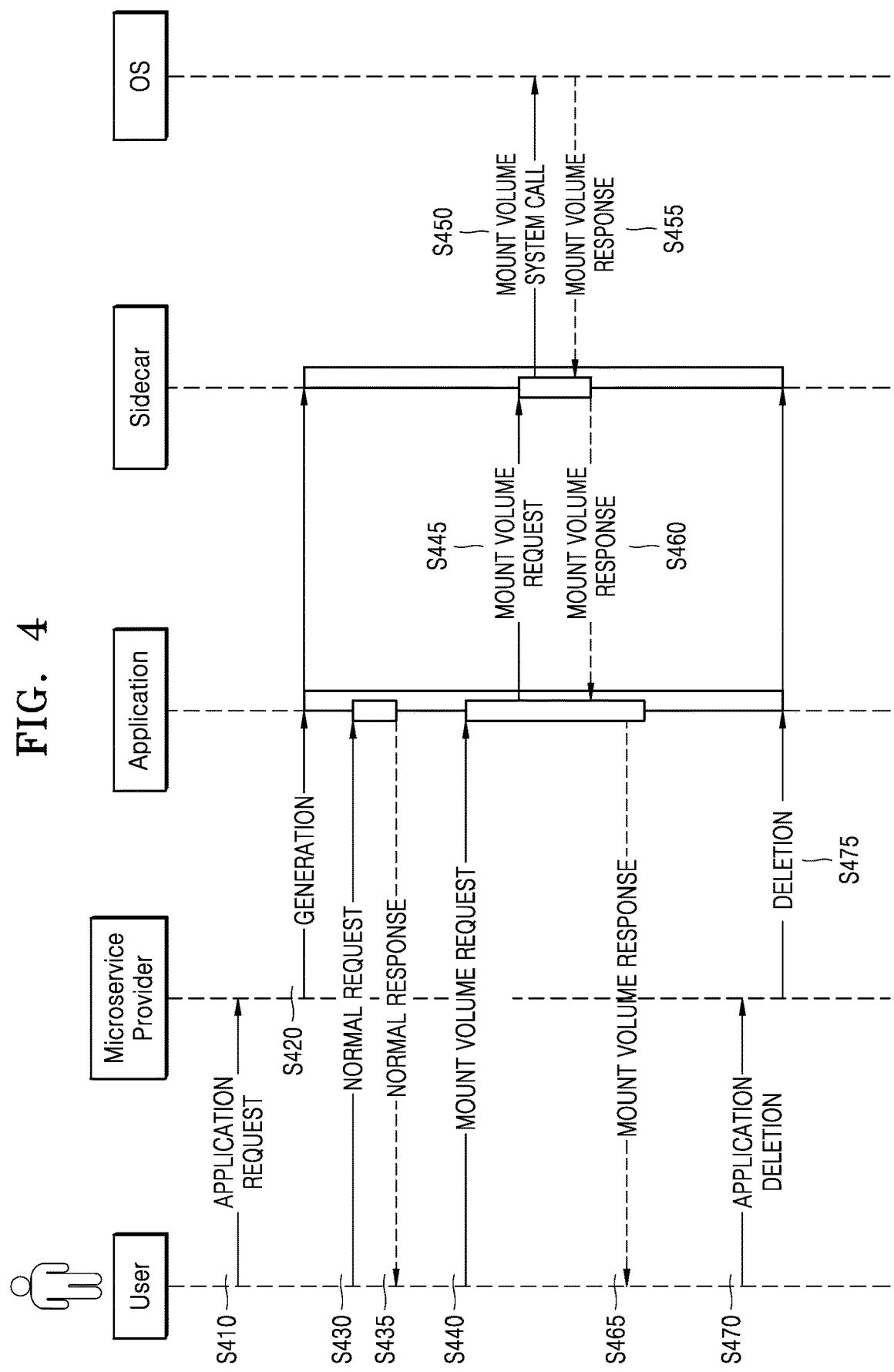
FIG. 4 is a flowchart showing a method of operating a container-based cloud system, according to an embodiment of the disclosure.

FIG. 4 is a flowchart showing a method of operating a container-based cloud system according to an embodiment of the disclosure.

Referring to FIG. 4, a user may send an application generation request to a microservice provider, in operation S410. The microservice provider may be a service for generating a microservice in a microservice architecture (MSA). The microservice may include an application and a sidecar according to an embodiment of the disclosure.

When the microservice provider receives the application generation request, the microservice provider may generate an application container including an application, and a sidecar container corresponding to the application container, in operation S420. The application container and the sidecar container may be generated in the same host (network), and share the same name space.

After the application is generated, the user may request the application to perform predefined operations through an interface, in operation S430. The predefined operations may be normal operations allowed within a scope of the user's authority. For example, the predefined operations may include a list operation (operation of opening a directory/folder), an open operation (operation of opening files in a directory), a read operation, a write operation, etc.

The application may perform the predefined operations (normal operations) requested by the user, and transmit a response signal about the performance of the predefined operations to the user (a user device), in operation S435.

Also, the user may request the application to mount a volume, in operation S440.

When the application receives a volume mount request from the user, the application may transmit the volume mount request to a sidecar, in operation S445. At this time, the application may transmit the volume mount request to the sidecar by using REST API, and, when the sidecar receives the volume mount request, the sidecar may determine whether there is a volume that is mountable on the application, and determine an optimal volume that is to be mounted on the application. The sidecar may request host OS to mount the determined volume, in operation S450. At this time, the sidecar may request the host OS to mount the volume by using a volume mount system call.

The host OS may mount the volume requested from the sidecar on a predefined directory/folder of the sidecar, in operation S455. When the volume is mounted on the sidecar, the application may access the volume mounted on the sidecar by using a host volume that the application shares with the sidecar. The operation has been described in detail with reference to FIG. 3, and therefore, a detailed description thereof will be omitted.

After the volume is mounted on the sidecar, the sidecar may transmit a response signal indicating that a volume mount has been completed to the application, in operation S460, and the application may transmit the response signal to the user (user device), in operation S465.

Also, the user may request the microservice provider to delete the application, in operation S470. When the microservice provider receives an application deletion request, the microservice provider may delete the application container including the application and the sidecar container corresponding to the application container, in operation S475.

Figure 5:
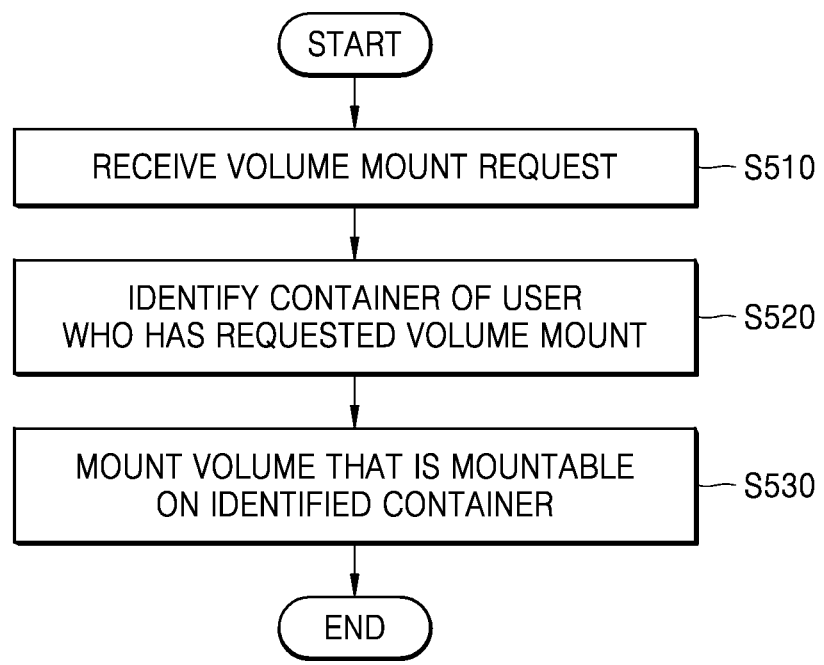
FIG. 5 is a flowchart showing a method of operating a cloud server, according to an embodiment of the disclosure.

FIG. 5 is a flowchart showing a method of operating a cloud server according to an embodiment of the disclosure.

Referring to FIG. 5, the cloud server 100 according to an embodiment of the disclosure may provide a container-based cloud service. When the cloud server 100 receives an application generation request from a user, the cloud server 100 may generate an application, and a container including a library, a binary, and other configuration files, requested to execute the application.

The cloud server 100 may receive a volume mount request from an application user, in operation S510. A volume mount may be a task of mounting a volume (for example, a remote data storage, etc.) on a predefined directory/folder of an application, and, through the volume mount, a direct access to massive data without an additional copy or movement of data may be possible.

The cloud server 100 may identify the application (or container) that has requested the volume mount, in operation S520, and determine whether there is a volume that is mountable on the identified application.

The cloud server 100 may mount a volume that is mountable on the identified application, and when the cloud server 100 determines that there are a plurality of volumes that are mountable on the application, the cloud server 100 may select an optimal volume from among the plurality of volumes and mount the volume, in operation S530.

Meanwhile, FIG. 5 shows a method of mounting a volume in the cloud server 100, however, the cloud server 100 according to an embodiment of the disclosure may unmount a volume by the same method.

Figure 6:
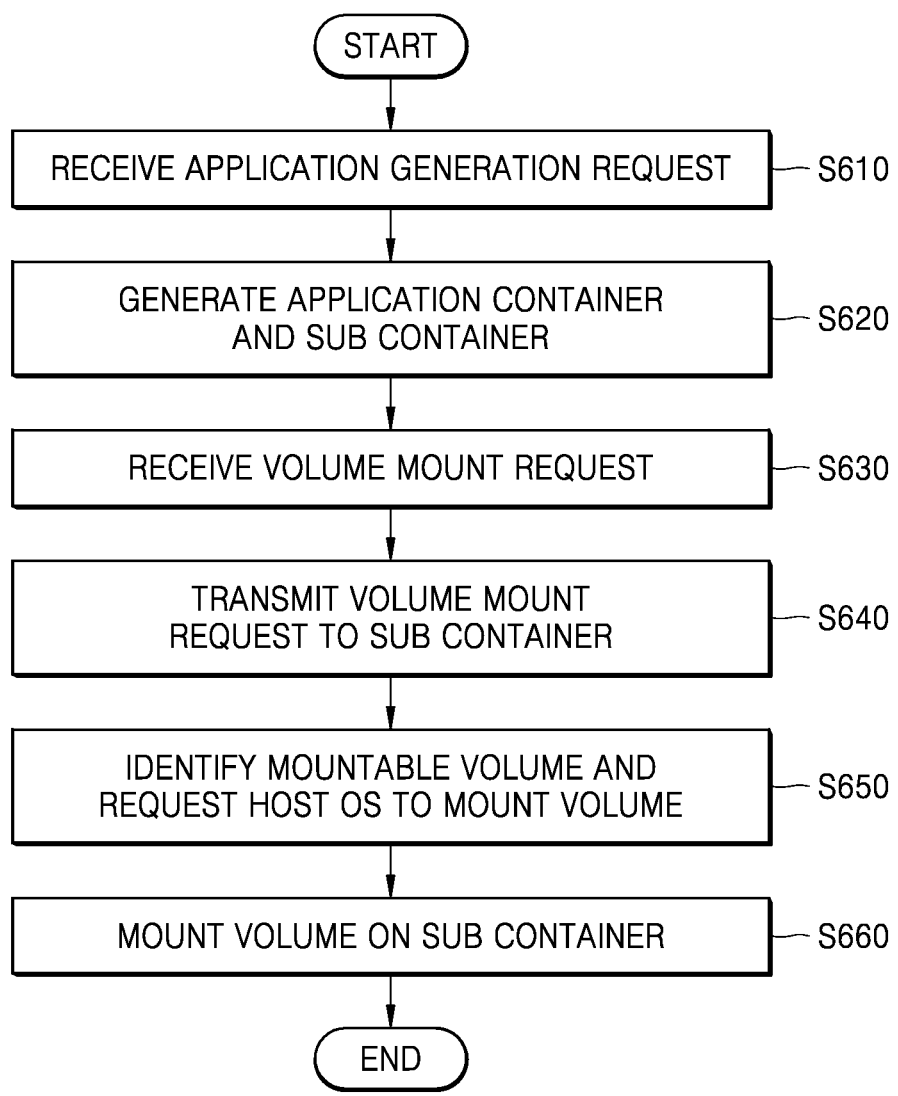
FIG. 6 is a flowchart showing a method of operating a cloud server, according to an embodiment of the disclosure.

FIG. 6 is a flowchart showing a method of operating a cloud server according to another embodiment of the disclosure.

Referring to FIG. 6, the cloud server 200 according to an embodiment of the disclosure may receive an application generation request, in operation S610.

When the cloud server 200 receives the application generation request, the cloud server 200 may generate a container including an application, and a sub container corresponding to the container, in operation S620. At this time, the container and the sub container may be generated in the same host, and share the same name space.

The sub container according to an embodiment of the disclosure may be a sidecar container including a sidecar of the application, although not limited thereto. A sidecar may be an assistance application that is distributed to the same host where a main application is located to expand and support functions of the main application.

Also, according to an embodiment of the disclosure, a predefined directory/folder of the container and a predefined directory/folder of the sub container may share a host volume, and may be connected to each other through the host volume.

The cloud server 200 may receive a volume mount request, in operation S630.

A volume mount may be a task of mounting a volume (for example, a remote data storage, etc.) on a predefined directory/folder of an application, and, through the volume mount, a direct access to massive data by using a predefined directory/folder of an application without an additional copy or movement of data may be possible. When the volume mount request is received from the application, the container may transmit the volume mount request to the sub container, in operation S640. At this time, the container may transmit the volume mount request by using REST API, although not limited thereto.

After the sub container receives the volume mount request, the sub container may check a volume mount authority of the application (or the container) to determine whether there is a volume that is mountable on the application. When the sub container determines that there are a plurality of volumes that are mountable on the application, the sub container may select an optimal volume from among the plurality of volumes, and request host OS to mount the volume, in operation S650. The host OS may mount the volume (additional volume) requested from the sub container on the predefined directory/folder of the sub container, in operation S660.

The container may access the additional volume mounted on the predefined directory/folder of the sub container through a host volume.

Meanwhile, FIG. 6 shows a method of mounting a volume in the cloud server 200, however, the cloud server 200 according to an embodiment of the disclosure may unmount a volume by the same method.

Figure 7:
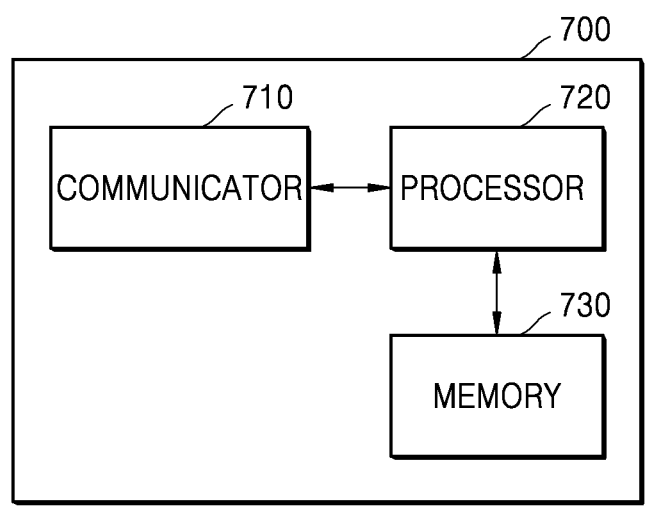
FIG. 7 is a block diagram showing a configuration of a cloud server according to an embodiment of the disclosure.

FIG. 7 is a block diagram showing a configuration of a cloud server according to an embodiment of the disclosure.

A cloud server 700 of FIG. 7 may be the cloud server 100 shown in and described above with reference to FIGS. 2 and 5 or the cloud server 200 shown in and described above with reference to FIGS. 3 and 6, although not limited thereto.

Referring to FIG. 7, the cloud server 700 according to an embodiment of the disclosure may include a communicator 710, a processor 720, and a memory 730.

The communicator 710 according to an embodiment of the disclosure may include one or more components that enable communications through a local area network (LAN), a wide area network (WAN), a value added network (VAN), a mobile radio communication network, a satellite communication network, and a combination thereof. Also, the communicator 710 may wirelessly transmit/receive data or signals directly to/from an external device or an external server by using a wireless LAN (for example, wireless-fidelity (Wi-Fi), etc.

The communicator 710 according to an embodiment of the disclosure may receive an application generation request from a user device, and, when an application is generated, the communication 710 may receive a request for predefined operations that are executable in the application. Also, the communicator 710 may receive a volume mount/unmount request for mounting/unmounting an additional volume on/from a predefined directory/folder of an application, from the user device.

The processor 720 according to an embodiment of the disclosure may control overall operations of the cloud server 700. Also, the processor 720 may control other components included in the cloud server 700 to perform the predefined operations.

The processor 720 according to an embodiment of the disclosure may execute one or more programs stored in the memory 730. The processor 720 may include a single core, a dual core, a triple core, a quad core, and a multiple core. Also, the processor 720 may include a plurality of processors.

The memory 730 according to an embodiment of the disclosure may store various data, programs, or applications for driving and controlling the cloud server 700.

Also, the programs stored in the memory 730 may include one or more instructions. The programs (one or more instructions) or applications stored in the memory 730 may be executed by the processor 720.

When the processor 720 according to an embodiment of the disclosure receives an application generation request from a user, the processor 720 may generate an application, and a container including a library, a binary, and other configuration files, required to execute the application. Also, when the processor 720 receives a volume mount/unmount request from a user, the processor 720 may identify an application (or container) that has sent the volume mount/unmount request, and mount/unmount a volume that is mountable/unmountable on/from the identified application.

Also, when the processor 720 according to an embodiment of the disclosure receives an application generation request from a user, the processor 720 may perform a control operation of generating a container including an application and a sub container corresponding to the container in the same host. At this time, the container and the sub container may share the same name space. Also, the sub container may be a sidecar container including a sidecar of the application. A predefined directory/folder of the container and a predefined directory/folder of the sub container may share a host volume, and may be connected to each other through the host volume.

When the processor 720 receives the volume mount/unmount request from the user, the processor 720 may perform a control operation of transferring the volume mount/unmount request from the container to the sub container. At this time, the volume mount/unmount request may be transferred through API (for example, REST API).

When the sub container receives the volume mount/unmount request, the processor 720 may control the sub container to check a volume mount authority of the application (or container) to determine whether there is a volume that is mountable on the application. When the sub container determines that there are a plurality of volumes that are mountable on the application, the processor may control the sub container to select an optimal volume from among the plurality of volumes and request host OS to mount the volume. The processor 720 may control the host OS to mount the volume (an additional volume) requested from the sub container on the predefined directory/folder of the sub container.

Meanwhile, the block diagram of the cloud server 700 shown in FIG. 7 may be a block diagram for an embodiment. Some components of the block diagram may be integrated into one component or omitted, or other components may be added to the cloud server 700, according to a specification of the cloud server 700 which is actually implemented. That is, two or more components may be integrated into one component or one component may be subdivided into two or more components, as necessary. Also, a function that is performed in each component (or each module) is provided to describe embodiments, and detailed operations or apparatuses therefor do not limit the scope of right of the disclosure.

The method of operating the cloud server according to the embodiments of the disclosure may be implemented in a program command form that can be executed by various computer means, and may be recorded on computer-readable media. The computer-readable media may also include, alone or in combination with program commands, data files, data structures, and the like. Program commands recorded in the media may be the kind specifically designed and constructed for the purposes of the disclosure or well-known and available to those of ordinary skill in the computer software field. Examples of the computer-readable media include magnetic media, such as hard disks, floppy disks, and magnetic tapes, optical media, such as compact disc-read only memory (CD-ROM) and digital versatile discs (DVD), magneto-optical media such as floptical disks, and hardware devices, such as read only memory (ROM), random access memory (RAM), flash memory, and the like, specifically configured to store and execute program commands. Examples of the program commands include high-level language codes that can be executed on a computer through an interpreter or the like, as well as machine language codes produced by a compiler.

Also, the method of operating the cloud server according to the embodiments of the disclosure may be included in a computer program product and provided. The computer program product may be traded between a seller and a purchaser.

The computer program product may include a software (S/W) program and a computer-readable storage medium storing an S/W program. For example, the computer program product may include an S/W program product (for example, a downloadable application) electronically distributed through a manufacturing company of a broadcast receiver or an electronic market (for example, Google Play Store or App Store). For electronic distribution, at least one part of the software program may be stored in a storage medium or temporarily generated. In this case, the storage medium may be a server of a manufacturing company, a server of an electronic market, or a storage medium of a relay server that temporarily stores an S/W program.

In a system configured with a server and a client, the computer program product may include a storage medium of the server or a storage medium of the client. Also, when there is a third device (for example, a smart phone) communicating with the server or the client, the computer program product may include a storage medium of the third device. Also, the computer program product may include an S/W program that is transmitted from the server to the client or the third device or from the third device to the client.

In this case, one of the server, the client and the third device may execute the computer program product to perform the method according to the embodiments of the disclosure. In this case, two or more of the server, the client and the third device may execute the computer program product to dispersively perform the method according to the embodiments of the disclosure.

For example, the server (for example, a cloud server or an artificial intelligence (AI) server) may execute the computer program product stored in the server to control the client communicating with the server to perform the method according to the embodiments of the disclosure.

The cloud server according to an embodiment of the disclosure may enable a user to easily perform a task of dynamically adding or deleting a new volume.

When the user dynamically adds or deletes the new volume, the user may need to neither restart a container nor change an application. Accordingly, the user may quickly perform a volume mount/unmount task.

Also, security for an additionally mounted volume may be secured.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A cloud server for providing a container-based cloud service, the cloud server comprising:
   a communicator configured to receive a volume mount request;
   a memory storing one or more instructions; and
   at least one processor configured to execute the one or more instructions stored in the memory to:
      generate a first sub container corresponding to a first container in a same host where the first container is located,
      control, when a volume mount request is received from a first user of the first container, the volume mount request to be transferred to the first sub container,
      control the first sub container to check a volume mount authority of the first container and request a host operating system (OS) to mount a first volume that is mountable on the first container, and
      control the first volume to be mounted on the first sub container.

2. The cloud server of claim 1, wherein the at least one processor is further configured to execute the one or more instructions to control the volume mount request to be transferred from the first container to the first sub container through an application programming interface (API).

3. The cloud server of claim 1,
   wherein the first container and the first sub container share a host volume, and
   wherein the host volume is correctable by only the first sub container.

4. The cloud server of claim 3, wherein the at least one processor is further configured to execute the one or more instructions to control the first volume to be mounted to the first container by allowing the first container and the first sub container to share the host volume.

5. The cloud server of claim 1,
   wherein the communicator is further configured to receive a request for generating a first application from the first user, and
   wherein the at least one processor is further configured to execute the one or more instructions to generate the first container and the first sub container corresponding to the first application, in response to the request for generating the first application.

6. The cloud server of claim 5,
   wherein the first container comprises the first application, and
   wherein the first sub container comprises a sidecar of the first application.

7. The cloud server of claim 5, wherein the at least one processor is further configured to execute the one or more instructions to:
   generate the first container and the first sub container in a first name space, and
   generate a second container and a second sub container corresponding to a second application in a second name space, in response to a request for generating the second application.

8. The cloud server of claim 1,
   wherein the first container is assigned a user authority level, and
   wherein the first sub container is assigned an administrator authority level.

9. A method of operating a cloud server for providing a container-based cloud service, the method comprising:
   generating a first sub container corresponding to a first container in a same host where the first container is located;
   receiving a volume mount request from a first user of the first container;
   transferring the volume mount request to the first sub container;
   checking a volume mount authority of the first container by the first sub container, and requesting a host operating system (OS) to mount a first volume that is mountable on the first container; and
   mounting the first volume on the first sub container.

10. The method of claim 9, wherein the transferring of the volume mount request to the first sub container comprises transferring the volume mount request from the first container to the first sub container through an application programming interface (API).

11. The method of claim 9,
    wherein the first container and the first sub container share a host volume, and
    wherein the host volume is correctable by only the first sub container.

12. The method of claim 11, wherein the first container is mounted to the first volume by sharing the host volume with the first sub container.

13. The method of claim 9, further comprising receiving a request for generating a first application from the first user,
    wherein the generating of the first sub container corresponding to the first container in the same host where the first container is located comprises generating the first container and the first sub container corresponding to the first application, in response to the request for generating the first application.

14. The method of claim 13,
wherein the first container comprises the first application, and
wherein the first sub container comprises a sidecar of the first application.

15. The method of claim 13,
wherein the generating of the first container and the first sub container comprises generating the first container and the first sub container in a first name space, and
wherein the method further comprises generating a second container and a second sub container corresponding to a second application in a second name space, in response to a request for generating the second application.

16. The method of claim 9,
wherein the first container is assigned a user authority level, and
wherein the first sub container is assigned an administrator authority level.

17. The method of claim 14, wherein the sidecar of the first application comprises an assistance application including functions in support of the main application.

18. The method of claim 13, further comprising:
receiving an application deletion request for deleting the first application; and
deleting the first sub container and the first container from the cloud server in response to the request for deleting the first application.

19. A non-transitory computer-readable recording medium storing a program, which when executed by at least one processor, causes the at least one processor to perform the method of claim 9.

* * * * *